March 4, 1930.  W. S. WOLFE ET AL  1,749,013
AIR BAG AND METHOD OF MANUFACTURING SAME
Filed Oct. 19, 1926   7 Sheets-Sheet 6

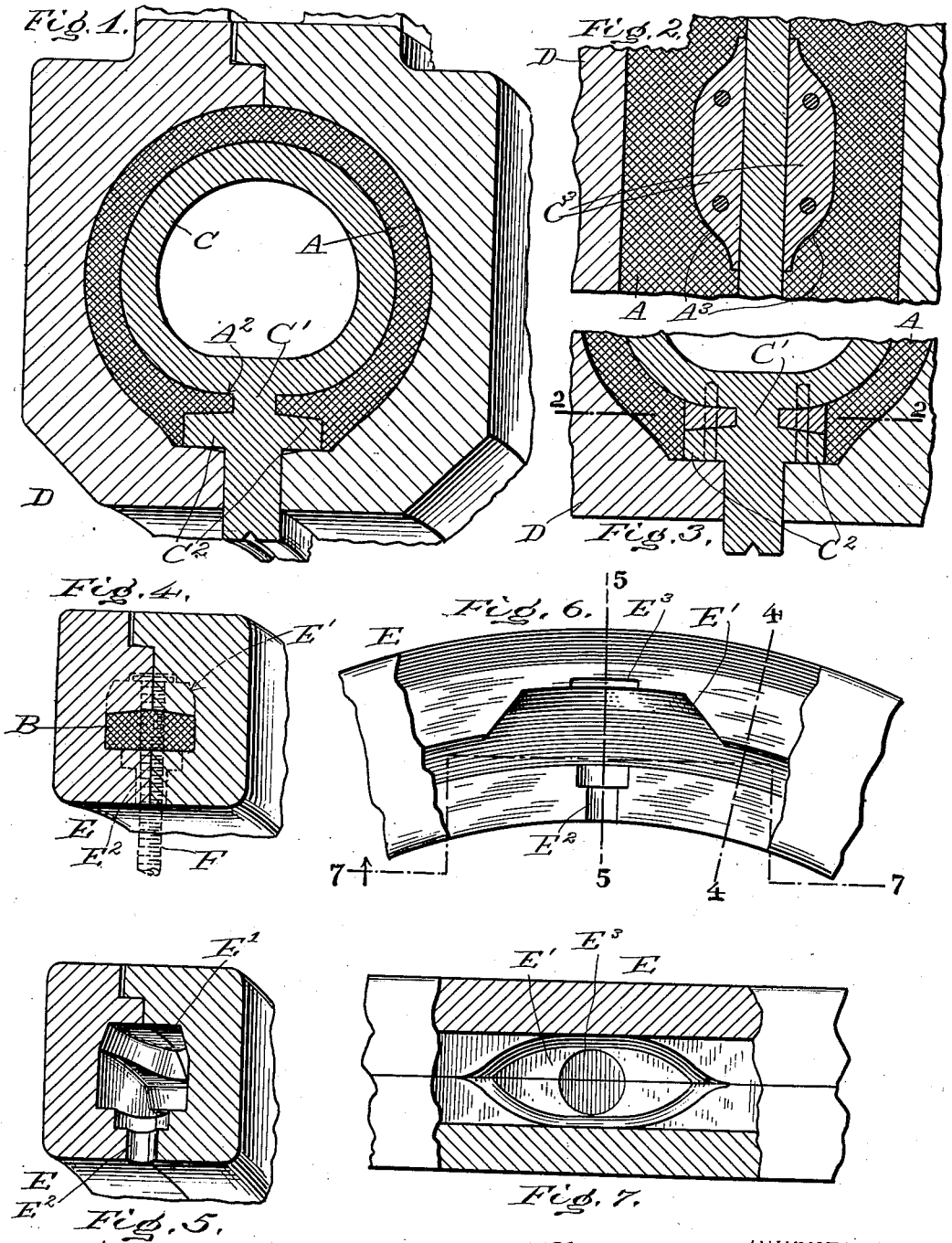

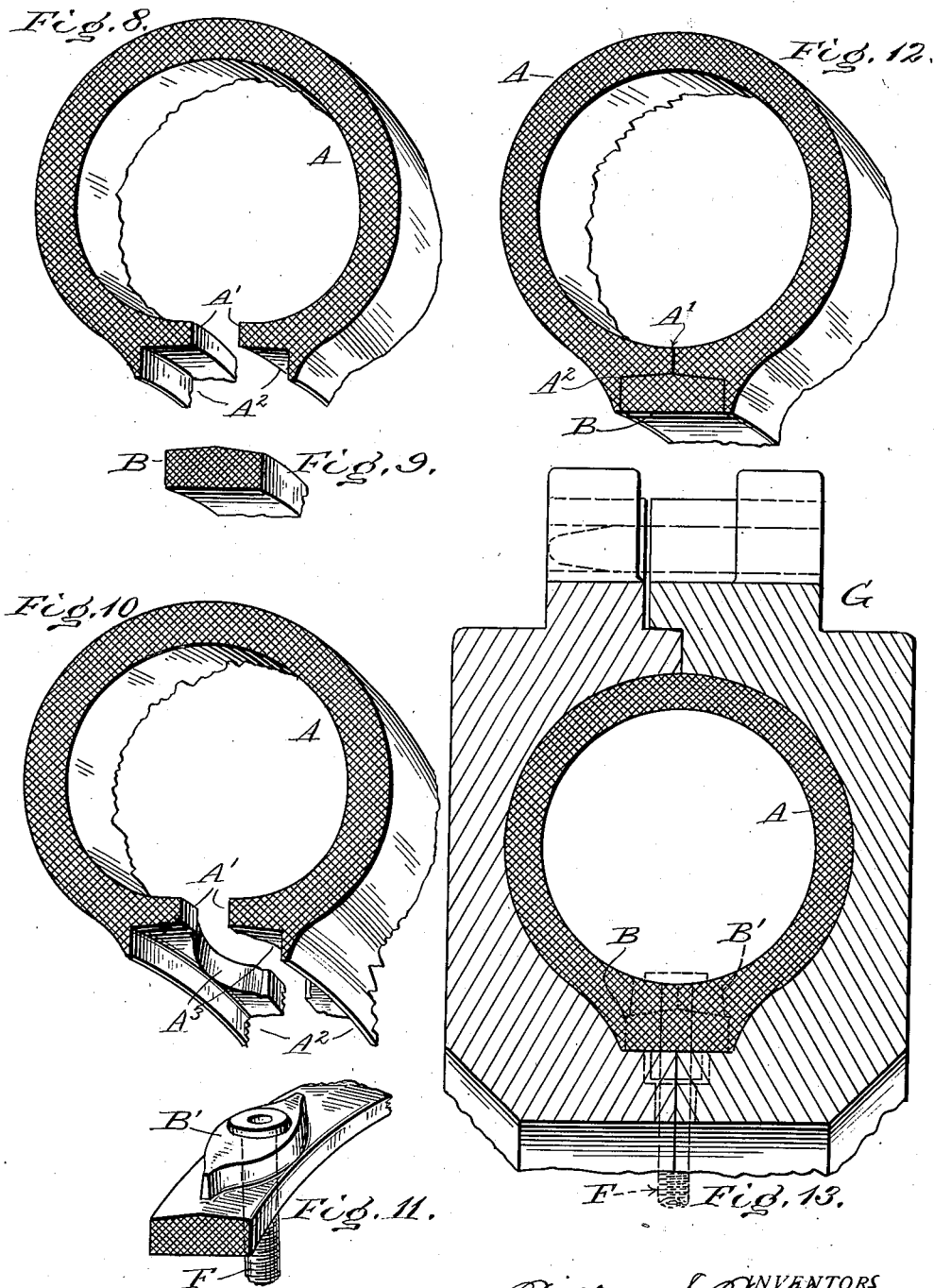

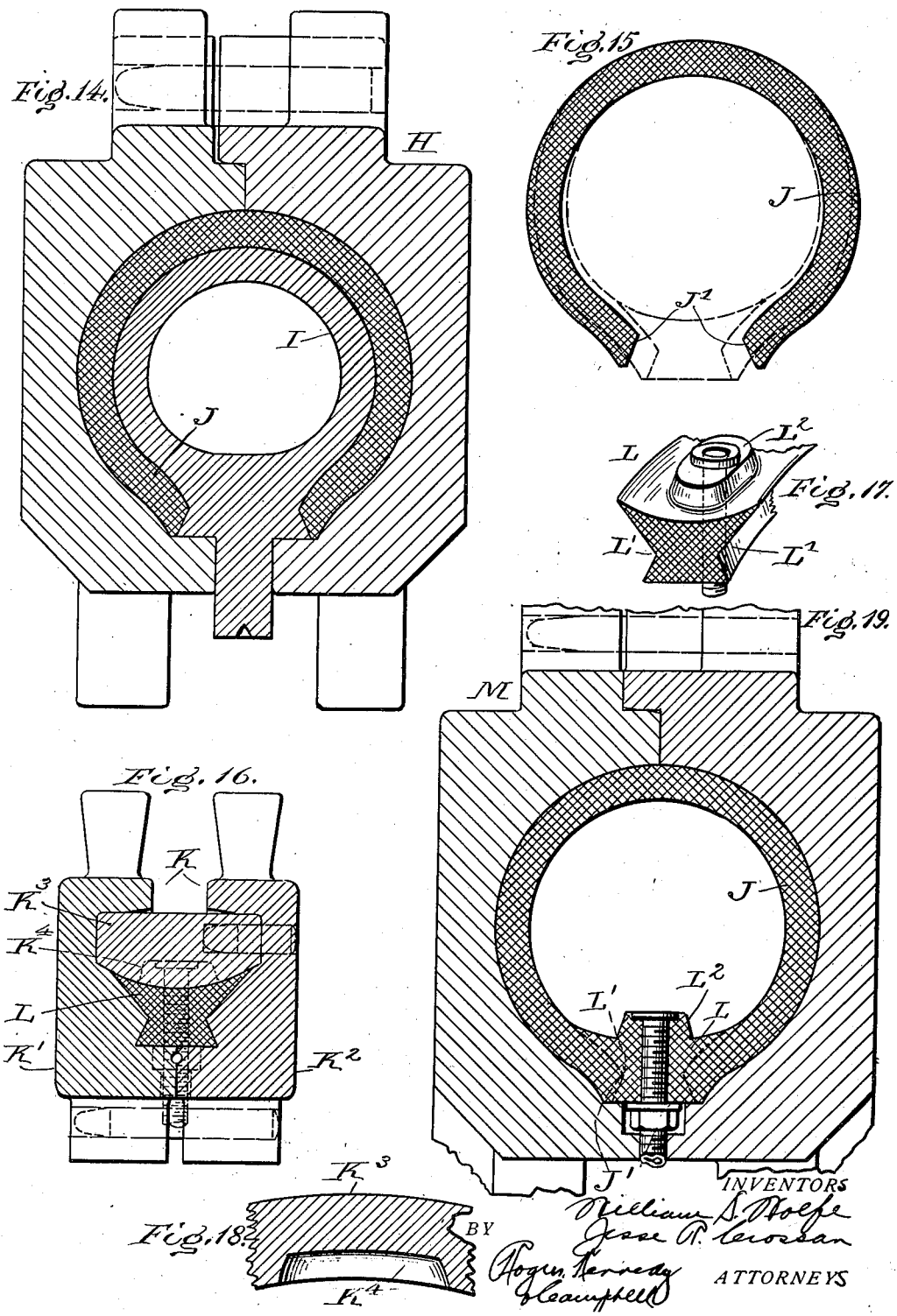

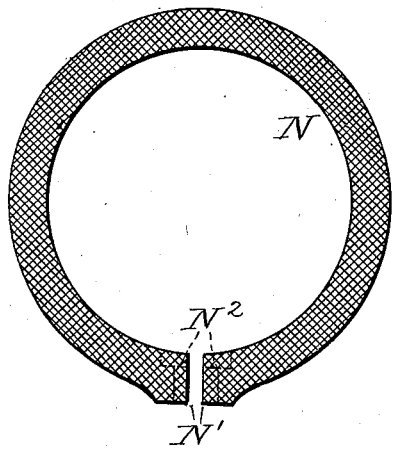
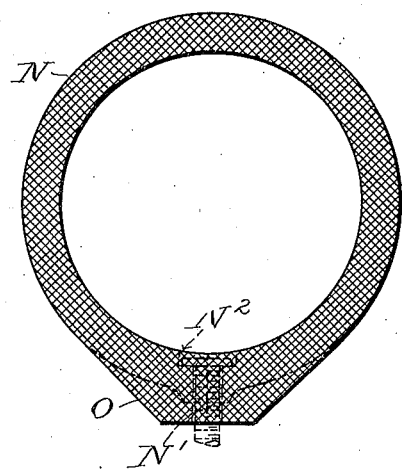
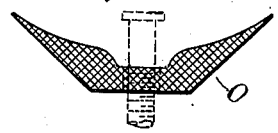

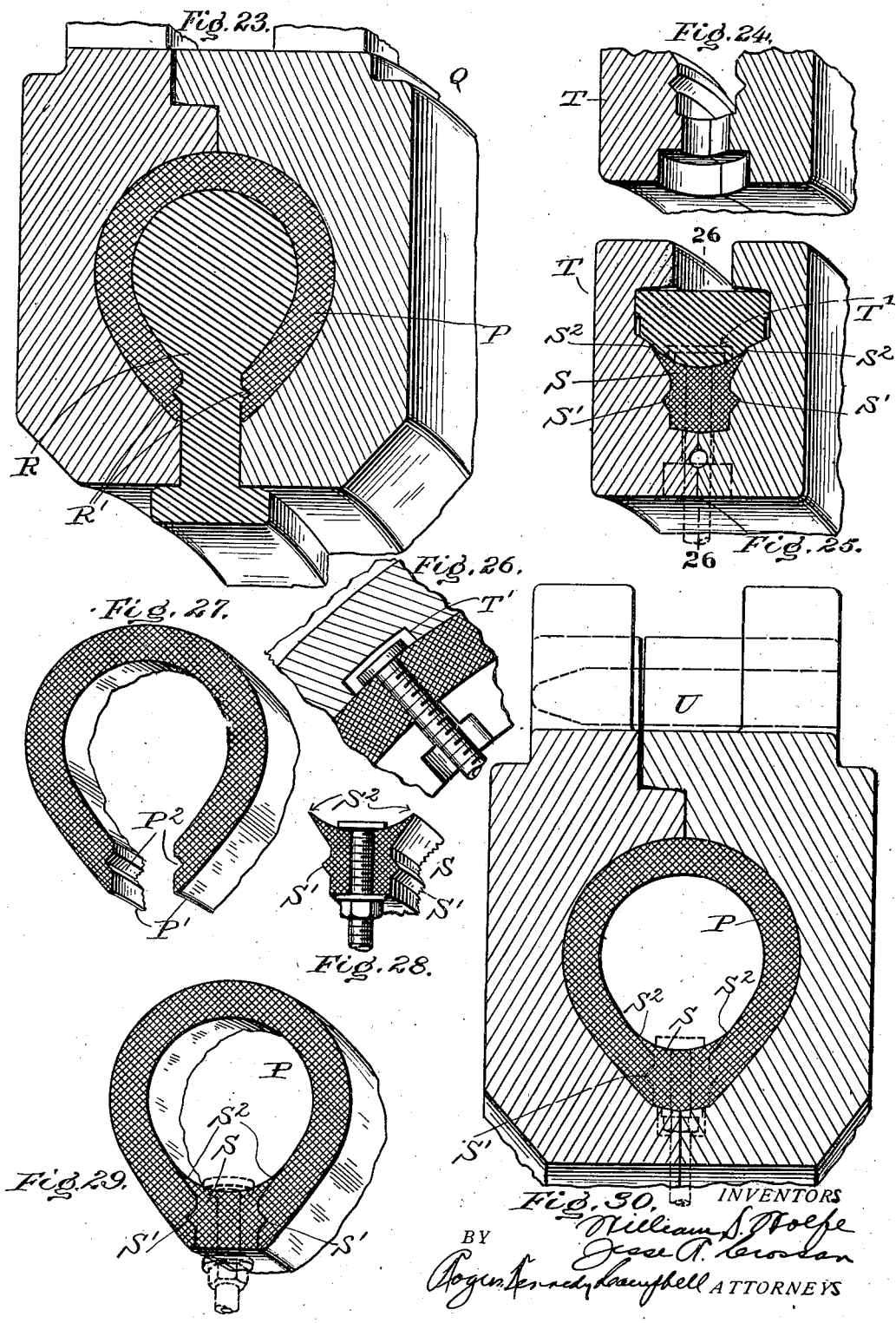

INVENTORS
William S. Wolfe
Jesse A. Crossan
BY
Rogers, Koresh, Campbell
ATTORNEYS March 4, 1930. W. S. WOLFE ET AL 1,749,013
AIR BAG AND METHOD OF MANUFACTURING SAME
Filed Oct. 19, 1926  7 Sheets-Sheet 7
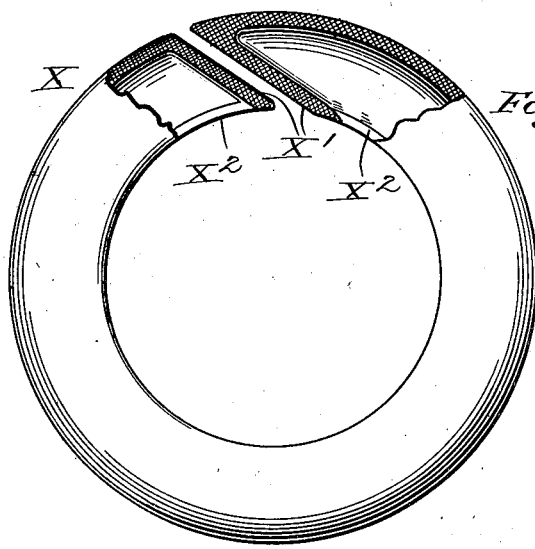
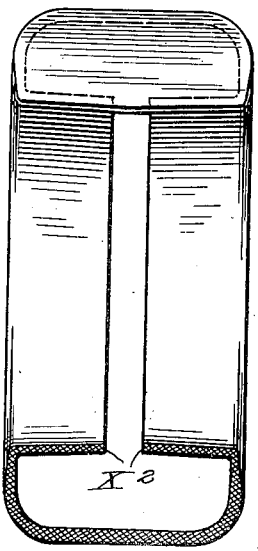
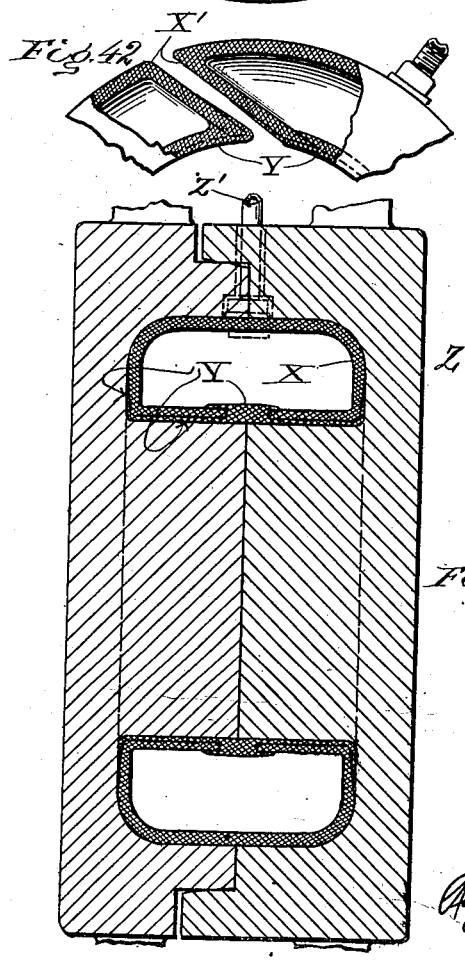
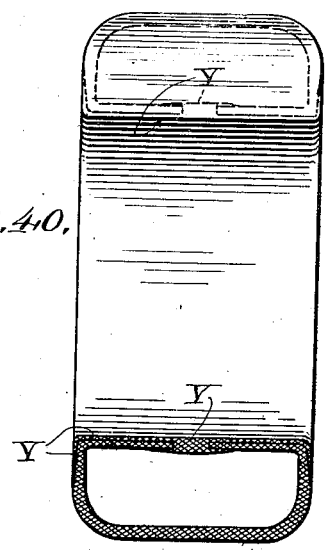
INVENTORS
William S. Wolfe
BY Jesse R. Crossan
Rogers, Kennedy Campbell ATTORNEYS Patented Mar. 4, 1930

1,749,013

UNITED STATES PATENT OFFICE

WILLIAM S. WOLFE, OF AKRON, AND JESSE R. CROSSAN, OF WADSWORTH, OHIO, ASSIGNORS TO SEIBERLING RUBBER COMPANY, A CORPORATION OF DELAWARE

AIR BAG AND METHOD OF MANUFACTURING SAME

Application filed October 19, 1926. Serial No. 142,553.

This invention relates to the art of vulcanizing inflatable rubber forms, such as so-called air bags, splicing bags, and the like, used in the manufacture and repair of automobile tires and tubes, etc. According to the prior practice generally prevailing, these air bags are first made up in complete form from unvulcanized rubber and are then cured at one operation in a suitable vulcanizing mold under the internal pressure of air, gas or water admitted into the raw bags. In preparing the raw bags (e. g., those intended for tire curing), the unvulcanized stock is rolled into the form of an open-ended tube upon a suitable mandrel, or else extruded in that form from a tubing machine, and after the attachment of the customary inflating valve, the ends of the tube are joined or spliced together to produce an endless circular tube, such as is required. When the raw tube as thus prepared is placed in the vulcanizing mold and inflated, it necessarily undergoes considerable stretching or buckling in being shaped to the mold cavity (which is not circular in cross-section, but which corresponds to the interior contour of the tire casing), with the result that thin or weak spots are often developed in the tube, the spliced ends are sometimes pulled apart, and the rubber is frequently separated from the valve stem causing leaks, etc. Moreover, the direct contact of the pressure fluid with the unvulcanized tube gives rise to other objections, such as the oxidation of the inside of the tube when air is used, or the under-curing of the inside of the tube when water or an inert gas is used. In short, it may be stated generally that air bags made in accordance with the old practice embodied many structural defects which render them subject to rapid deterioration when in use and materially shorten their life.

The present invention is intended to do away with the foregoing and other objections, and contemplates the production of the air bags of a form and in a manner which will greatly prolong their life when in service. Generally speaking, it is proposed to make up the raw bags in sections, say one a main or body portion, and the other a base or closure portion, then partially vulcanize or semicure the sections in separate molds, the body portion upon a metal core and the closure portion with the valve stem in place, and subsequently, after assembling the semi-cured sections in proper relation, subject them to a final vulcanization to unite them into a homogeneous whole, this latter operation being carried out by placing the assembled unit in a suitable vulcanizing mold and admitting the pressure medium to the interior through the valve stem. According to this method, the bags may be given the exact shape, thickness, compactness, etc., desired, thoroughly and properly cured on the inside, and the rubber stock firmly united or cured to the valve stem. These and other advantages will be more readily appreciated after reading the detailed description which follows.

Referring to the drawings:

Fig. 1 is a transverse sectional view of a portion of a vulcanizing mold in which the body portion of the improved air bag is semi-cured;

Fig. 2 is a horizontal sectional view taken on the line 2—2 of Fig. 3;

Fig. 3 is a fragmentary view similar to Fig. 1 of another portion of the vulcanizing mold and showing how provision is made for the valve reinforcement;

Fig. 4 is a transverse sectional view of a vulcanizing mold in which the base or closure portion of the improved air bag is semi-cured, the section being taken on line 4—4 of Fig. 6;

Fig. 5 is a similar view taken on line 5—5 of Fig. 6 (the mold being empty), and looking into the mold recess for forming the valve reinforcement;

Fig. 6 is a fragmentary elevation of the vulcanizing mold of Figs. 4 and 5, showing the inner surface of one of its sections;

Fig. 7 is a sectional plan view taken on the line 7—7 of Fig. 6;

Fig. 8 is a fragmentary perspective view, partly in section, of the semi-cured body portion per se;

Fig. 9 is a similar view of the semi-cured base portion per se;

Fig. 10 is a view similar to Fig. 8 showing the recess for the valve reinforcement;

Fig. 11 is a view similar to Fig. 9 showing the base portion with the valve in place;

Fig. 12 is a perspective view showing the body and base portions in assembled relation;

Fig. 13 is a transverse sectional view of a vulcanizing mold in which the two semi-cured portions are finally cured together;

Figure 31:
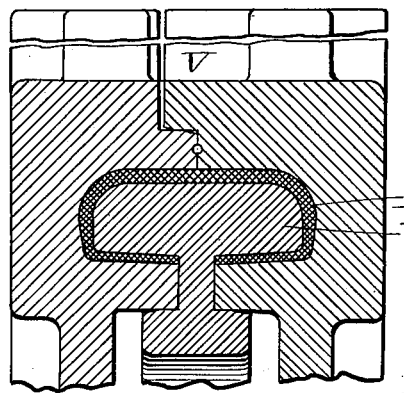
Figure 32:
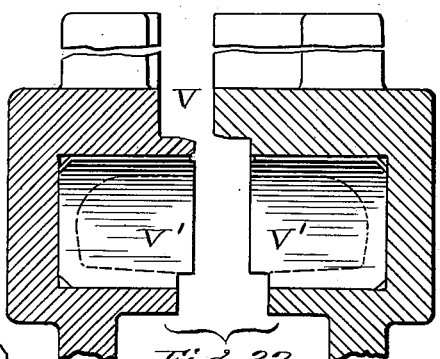
Figure 33:
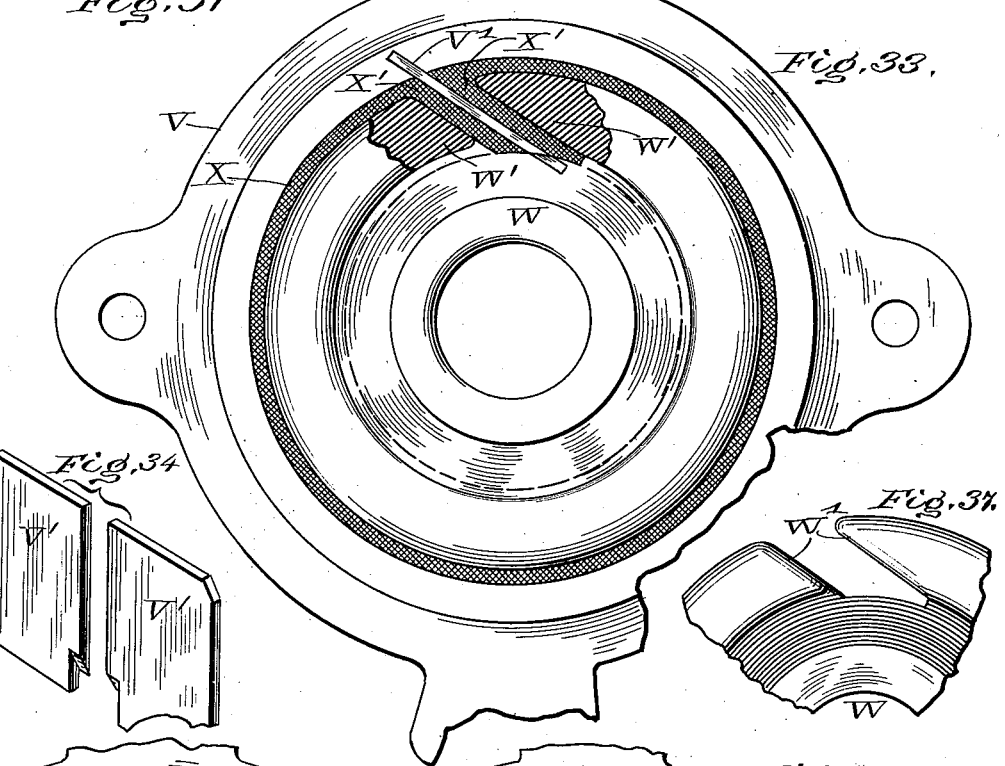
Figure 34:
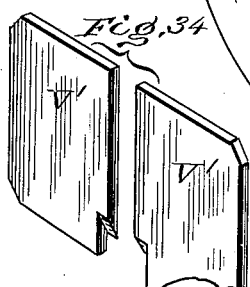
Figure 37:
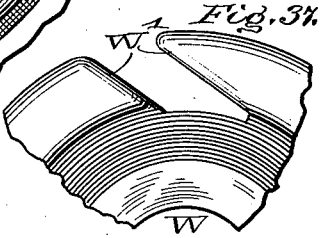
Figures 35, 36:
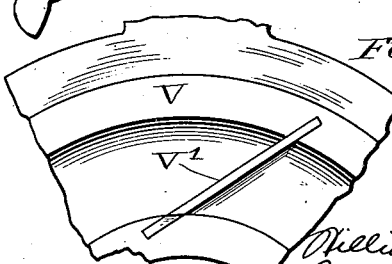

Figs. 14 to 19 illustrate a second embodiment of the invention, Figs. 14 and 16 being transverse sectional views of the semi-curing molds for the body and base portions, respectively, Fig. 15 a transverse section of the semi-cured body portion per se, Fig. 17 a sectional perspective view of the semi-cured base portion per se, Fig. 18 a longitudinal section of the outer ring of the mold shown in Fig. 16, and Fig. 19 a transverse sectional view of the mold in which the two semi-cured portions are finally cured;

Figs. 20, 21 and 22 illustrate a third embodiment of the invention, being transverse sections of the semi-cured body portion per se, the semi-cured base portion per se, and the two sections as finally cured in assembled condition;

Figs. 23 to 30 illustrate a fourth embodiment of the invention, Fig. 23 being a sectional perspective view of the semi-curing mold for the body portion, Figs. 24 and 25 similar views of the semi-curing mold for the base portion, Fig. 26 a longitudinal section taken on the line 26—26 of Fig. 25, Figs. 27, 28 and 29 sectional perspective views of the semi-cured body and base portions in separated and assembled conditions, and Fig. 30 a transverse section of the mold in which the two assembled sections are finally cured together;

Figs. 31 to 42 illustrate a fifth embodiment of the invention, which, in this instance, is shown as applied to a splicing bag, Figs. 31 and 32 being transverse sectional views of the semi-curing mold for the body portion, the mold sections in the latter view being shown as separated, Fig. 33 an inner face view of said mold with the splicing bag and its core in place, Fig. 34 a perspective view of the insert plates which define the end walls of the splicing bag, Figs. 35 and 36 inner face views of the two mold sections with the insert plates attached, Fig. 37 a side elevation of the core for the body portion, Fig. 38 a side elevation, partly in section, of the semi-cured body portion, Fig. 39 a view taken on the line 39—39 of Fig. 38. Fig. 40 a view similar to Fig. 39, showing the semi-cured body portion with the uncured base portion attached, Fig. 41 a transverse sectional view of the mold in which the bag is finally cured, and Fig. 42 a fragmentary side elevation, partly in section, of the finally cured bag.

In carrying out the invention, the air bag is made up of a plurality of sections, which are first partially vulcanized or semi-cured in separate metal molds and which are thereafter fully vulcanized or finally cured while in assembled condition in a further mold under internal pressure. As preferred, the bag is built up of two sections only, one a hollow main or body portion, which is semi-cured on an iron core, and the other a solid base or closure portion, which is semi-cured with the valve stem in place. After being separately semi-cured, the two sections are fitted and cemented together to complete the bag and are then united into a homogeneous mass by the final cure. This, in brief, is the procedure followed in connection with all of the embodiments illustrated, except perhaps the last, but inasmuch as each embodiment differs in one way or another from the others, they will all be described somewhat in detail.

Reference will first be made to the embodiment illustrated in Figs. 1 to 13. In Fig. 1, the main or body portion A is shown as mounted upon a ring core C and confined within a divided or two-part mold D, ready to be partially vulcanized or semi-cured. This semi-curing operation may be carried out in any of the well-known ways, as by placing the mold in a suitable vulcanizer or press and subjecting it to the required heat for the proper length of time. After such vulcanizing operation, the body portion is taken from the mold and stripped from the core, being molded to the shape and of the thickness determined by the mold cavity provided by the core and the walls of the mold sections. In this instance, the semi-cured body portion is in the form shown in Figs. 8 and 10, presenting two opposite edge portions $A^1$ with an intervening gap produced by the tongue $C^1$ of the core $C$ and two annular grooves or recesses $A^2$ produced by the annular ribs or flanges $C^2$ extended laterally from the tongue of the core. At one point in their circumference, the edge portions $A^1$ are formed with opposite curved recesses $A^3$ (Fig. 10) formed by filler blocks $C^3$ attached to the opposite sides of the core tongue between the ribs $C^2$ and the core proper (see Figs. 2 and 3). The body portion A may, of course, be made up in its green or raw state in various ways, but in practice it is proposed to apply the rubber stock in one or more plies directly to the ring-core C by the use of the customary stitching or spinning tools employed in tire building.

In Fig. 4, the base or closure portion B is shown as placed within the divided or two-part mold E and with the valve stem F in place, ready to be partially vulcanized or semi-cured. This semi-curing operation may likewise be carried out by placing the mold in a suitable vulcanizer or press and subjecting it to the required heat for the proper length of time. After the semi-curing, the base portion is taken from the mold, which gives it the form shown in Figs. 9 and 10, being of a size and shape to fit within and fill up the annular grooves or recesses $A^2$ of the body portion A when its two edges $A^1$ are brought together into contacting relation, as indicated in Fig. 12. As will be noted from Fig. 11, the semi-cured base portion B is provided with a reinforcing pad $B^1$ produced by a recess or depression $E^1$ formed in the outer wall of the mold cavity, this reinforcing pad being shaped to fit snugly within the recesses $A^3$ of the body portion A when the two sections are assembled. In this connection, it is also pointed out that the mold sections are provided with appropriate holes or recesses $E^2$ and $E^3$ to accommodate the inflating valve, the recess $E^2$ being cut through the inner wall of the mold cavity to receive the valve stem (Figs. 5 and 6), and the recess $E^3$ being countersunk in the outer wall of the mold cavity to receive the base of the valve stem (Figs. 6 and 7). It will be understood that the base portion B may be prepared from the rubber stock of a form to fit approximately within the vulcanizing mold, or the mold itself relied upon to give it the necessary shape during vulcanization.

The two sections of the bag having now been prepared and separately semi-cured, they are fitted and cemented together in the manner indicated in Fig. 12, that is to say, with the edges $A^1$ of the body portion in abutting relation and with the base portion B filling the grooves $A^2$ (now, in effect, a single groove), and with the reinforcing pad $B^1$ fitted within the recesses $A^3$ (now, in effect, a single hole or opening). After thus being assembled, the complete bag is placed in a divided or two-part mold G of the proper size and shape, as indicated in Fig. 13, for the final cure or complete vulcanization. This final vulcanizing operation is effected by introducing the pressure medium (air, gas or water) through the inflating valve and placing the mold in a suitable vulcanizer or press to subject the bag to the required degree of heat for the proper length of time. After this second vulcanizing operation, the bag is stripped from the mold and is ready for use, its two sections being vulcanized together as a homogeneous whole, just as if it had originally been built as a complete unit and vulcanized by a single cure.

Referring next to the embodiment illustrated in Figs. 14 to 19, the procedure is precisely the same as above outlined, the only essential difference being in the form of the two sections of the bag. In this case, the semi-curing mold H and ring-core I are formed so as to mold the body portion J in the shape illustrated in Fig. 15, that is to say, with its edges $J^1$ flared outwardly or angularly disposed with reference to each other. Similarly, the semi-curing mold K is formed so as to mold the base portion L in the shape illustrated in Fig. 17, that is to say, with two angular grooves $L^1$ to receive the correspondingly shaped edges $J^1$ of the body portion J. After the two sections have been semi-cured, the base portion is inserted into the body portion through the gap left between its edges (see dotted lines in Fig. 15), and the two sections are then cemented together and finally cured in the mold M (Fig. 19), the base portion serving in effect as a closing plug for the body portion and having a dove-tailed interlocking engagement therewith. The semi-curing mold K for the base portion, in this instance, is made up of three parts, the two rings $K^1$ and $K^2$ defining the inner and side walls of the mold cavity, and a third ring $K^3$ defining the outer wall of said cavity. The ring $K^3$ is formed with a recess or depression $K^4$ (Fig. 18) to produce the reinforcing valve pad $L^2$, as seen in Fig. 17.

Figs. 20, 21 and 22 illustrate another embodiment of the invention, although to avoid needless illustration the molding apparatus has not been shown. In Fig. 20, there will be seen the semi-cured body portion N, presenting separated edges $N^1$ as before, but in this instance formed with recesses $N^2$ to receive the valve stem and base. Fig. 21 shows the semi-cured base portion O, with the valve stem projecting outwardly to enter the recesses $N^2$ when the two sections are brought together, as in Fig. 22. When thus brought together and finally cured, the edges $N^1$ of the body portion contact with each other throughout except at the valve stem, which they closely engage, and the base portion acts as a bridge across the line of contact, extending laterally therethrough in both directions for a considerable distance in order to effect a good union with the body portion.

The three forms of air bag thus far described are best suited for use in connection with straight-side tires, although obviously they could be readily modified to accommodate other kinds of tires as well. For clincher tires, the embodiment illustrated in Figs. 23 to 30 is recommended. Here, again, the procedure is practically the same as above set forth, the principal difference residing in the form of the two sections of the bag. The body portion P is semicured in the mold Q upon the ring-core R (Fig. 23), being shown in semi-cured condition in Fig. 27 and having its separated edges $P^1$ formed with opposite V-shaped annular grooves $P^2$ produced by similar shaped ribs $R^1$ on the core tongue. The base portion S is semi-cured in the three-part mold T (Figs. 24 and 25), being shown in its semi-cured condition in Fig. 28 and having V-shaped ribs $S^1$ adapted to fit within the V-shaped grooves $P^2$ of the body portion when the two sections are cemented together, as in Fig. 29. It may also be noted that the base portion is formed at its outer periphery with laterally extending wings or skirts S² to overhang the edges of the body portion. The final cure of the two sections in their assembled condition is effected in the properly dimensioned mold U after inflation. In this instance, the base portion has no reinforcing pad for the valve stem, being thick enough in itself to provide a good union with the stem. The recess T¹ formed in the outer wall of the mold cavity (Fig. 26) is arranged to receive and accommodate the base of the valve stem.

The advantages of the improved method above described will now be more readily appreciated. First, the main or body portion of the bag may be given the exact shape and thickness desired, due to molding between two machined surfaces. Second, the valve stem is vulcanized in place in the base portion without air pressure, the mold pressure acting to ensure a good union between the rubber and the stem. Third, owing to the sectional nature of the air bag prior to final vulcanization, all parts of the bag may be freely inspected and any necessary repairs made before the sections are permanently united, this feature being particularly advantageous for making repairs in the vicinity of the valve stem. Fourth, the material composing the bag may be placed with great accuracy in building the raw tube, and especially when ply stock is employed, it being possible in such case to use special inside, middle or outside plies in any combination. Moreover, and due to the absence of any stretch within the mold, the same effective thickness of the tube is secured by the use of materially less stock or plies of less thickness. Fifth, due to the molding of the separate sections, which allows for increased or greater curing pressures, a closer knit or more compact stock is obtained to combat deterioration, and if plies are used, a better union is secured, due to pressure. Sixth, all surfaces of the bag are properly cured and molded, due to the direct contact with the metal surfaces of the mold which become heated during vulcanization. This latter feature is particularly desirable in the case of the inside surface of the tube, which in use must withstand the constant attack of the pressure medium, whether air, water or some other fluid, and the constant changes in temperature which take place when using the bag over and over again in curing different tires. Seventh, the two sections of the bag being molded to shape in the semi-cure and without stretching, there is no tendency to open up the splices or to create weak or thin spots in the rubber stock, or to pull the stock away from the valve stem, during the final vulcanization. Eighth, great accuracy in manufacturing, with less highly skilled labor and low manufacturing costs. Other advantages might be mentioned, but enough has been said to indicate the advance made in the art.

In the embodiment illustrated in Figs. 31 to 42, the invention is shown as applied to a splicing bag, such as is used in the art for joining the ends of inner tubes. As shown in Figs. 38 to 42, the splicing bag differs from the ordinary tire-curing bag in that it is not endless but is diagonally split at one point in its circumference to present two overlapping end portions. However, the bag may be and is constructed according to the procedure above described, the difference again residing mainly in the form of the body and base portions. The body portion X is semi-cured in a divided or two-part mold V upon the iron core W (Figs. 31 and 32), being molded in the form shown in Figs. 38 and 39 and with the end portions X¹. To produce these end portions X¹, the two mold sections are provided with insert plates V¹ (Figs. 34, 35 and 36), which, when the two sections are closed together, meet edge to edge and afford a wall or partition between the separated end portions W¹ of the core (see Fig 33). After the body portion has been semi-cured in this manner, the gap between its inner edges X² is closed up by the base portion Y (Fig. 40), which presents a thick central rib to plug up the gap, two narrow inside flaps to overlap the edges of the body portion, and two wide outside flaps extending entirely across the inner wall of the body portion and up along its sides. This peculiar construction is resorted to owing to the thinness of the walls of the body portion and in order to render it absolutely fluid-tight. The base portion Y, in this instance, is not semi-cured, but is applied in unvulcanized condition, reliance being placed upon the final cure to effect the proper vulcanization of the base portion and its proper union to the body portion. This final cure is effected in the vulcanizing mold Z and under the pressure of a suitable fluid introduced into the bag through the valve stem Z¹. This valve stem is attached to the main or body portion after it is semi-cured and before the application of the base portion. The present embodiment lacks the advantage of vulcanizing the valve stem to the base portion, but this advantage is not so important in the case of splicing bags, which are used in an entirely different way from that of air bags. As is well known, a splicing bag when in use is confined within a mold or holder, except at its inner wall, which alone is left free to exert pressure inwardly toward a mandrel upon which the splice is made.

In the broader aspects of the invention, it is not absolutely essential that the base portion of the air bag be separately semi-cured, as in the four embodiments first discussed, although it is desirable in the case of tire curing air bags, for the reasons previously mentioned. In other words, it would be entirely feasible to semi-cure the body portion only and to apply the base portion in unvulcanized condition and then rely upon the final cure to unite the two portions into an integral unit, it being understood that the base portion could be made of special stock, which would cure sufficiently in the final vulcanization. As a matter of fact, in some cases it would be possible to eliminate the base portion entirely and to semi-cure the body portion in such form that its edges would be directly united in the final cure. Or, as a further alternative, the body and base portions might both be more or less completely vulcanized and then permanently united in some suitable way, as by means of an acid cure. While such modifications might involve some sacrifice of the many advantages before enumerated, they would still comprise the principal advantages derived from semi-curing the body portion in a mold upon a core. It should be understood, therefore, that the invention is not limited to any particular method of procedure or embodiment, except in so far as such limitations are specified in the appended claims.

Having thus described our invention, what we claim is:

1. The method of producing an inflatable former, which consists in building the former of a plurality of continuous annular sections of unvulcanized rubber, said sections differing from each other in cross-sectional configuration, vulcanizing the sections separately, and uniting the vulcanized sections under internal pressure to form a complete whole.

2. The method of producing an inflatable former, which consists in building the former of a continuous annular body portion and a continuous annular base portion of unvulcanized rubber, said portions differing from each other in cross-sectional configuration, partially vulcanizing said body and base portions separately, and completing the vulcanization of the sections in assembled condition and with internal pressure to form them into a homogeneous whole.

3. The method of producing an expansible and inflatable rubber former, which consists in vulcanizing the body portion, with a continuous annular cavity and uniform wall thickness throughout, upon a metal core, leaving an annular opening for the removal of the core, then removing the core, and subsequently permanently closing the opening in the body portion with additional material to produce the final article.

4. The method of producing an expansible and inflatable rubber former, which consists in partially vulcanizing the body portion with uniform wall thickness throughout upon a metal core to form an annular cavity, leaving an annular opening at the inner side of the body for the removal of the core, removing the core, closing the opening with additional material, and completing the vulcanization of the body portion with its opening so closed under internal pressure to produce the final article.

5. The method of producing an expansible and inflatable rubber former, which consists in providing a hollow annular body portion and a separate solid annular base member, partially vulcanizing the body portion upon a metal core, leaving an annular opening for the removal of the core, removing the core, applying the base member to the body portion to close the opening in the latter, and vulcanizing the two sections together as a homogeneous unit.

6. The method of producing an expansible and inflatable rubber former, which consists in providing a hollow body portion with uniformly thick walls and a separate solid annular base portion, partially vulcanizing the body portion upon a metal core, leaving an annular opening for the removal of the core, removing the core, partially vulcanizing the base member in a suitable mold, and completing the vulcanization of the two sections in assembled condition to form them into a homogeneous unit.

7. The method of producing an expansible and inflatable rubber former, which consists in partially vulcanizing the annular body portion with uniform wall thickness throughout and a continuous cavity in a suitable mold upon a metal core, leaving an annular opening at the inner side of the body for the removal of the core, removing the core, and completing the vulcanization of the body portion in a suitable mold and under internal pressure with its opening closed by additional material to produce the final article.

8. The method of producing an expansible and inflatable rubber former, which consists in providing a hollow annular body portion and a separate solid annular base member, partially vulcanizing the body portion in a suitable mold upon a metal core, leaving an annular opening for the removal of the core, removing the core, applying the base member to the body portion to close the opening in the latter, and vulcanizing the two sections together in a suitable mold under internal pressure.

9. The method of producing an expansible and inflatable rubber former, which consists in providing a hollow annular body portion and a separate solid annular base member, partially vulcanizing the body portion in a suitable mold upon a metal core, leaving an annular opening for the removal of the core, removing the core, partially vulcanizing the base member in a suitable mold, and completing the vulcanization of the two sections in assembled condition in a suitable mold under internal pressure.

10. The method of producing an inflatable rubber former, which consists in providing a hollow annular body portion and a separate solid annular base member containing an inflating valve, partially vulcanizing the two sections separately and then completing the vulcanization of the two sections while they are held in assembled condition by internal pressure.

11. The method of producing an expansible and inflatable rubber former, which consists in providing a hollow annular body portion with uniformly thick walls and a separate solid annular base member containing an inflating valve, partially vulcanizing the body portion upon a metal core, leaving an annular opening for the removal of the core, removing the core, partially vulcanizing the base member with the valve in a suitable mold, and completing the vulcanization of the two sections in assembled condition in a suitable mold under pressure of a fluid admitted to the interior of the assembled unit through said inflating valve.

12. An expansible inflatable former composed only of vulcanized rubber and made up of a hollow molded annular body portion having uniform wall thickness throughout and a solid separately molded annular base portion, the two portions being permanently united as an integral unit.

13. An expansible inflatable former composed only of vulcanized rubber and made up of a hollow molded annular body portion having uniform wall thickness throughout and a solid separately molded annular base portion, the two portions being vulcanized together as a homogeneous whole.

14. An expansible inflatable rubber former composed of a hollow molded rubber annular body portion and a solid separately molded rubber annular base portion containing an inflating valve united thereto by vulcanization, the two said sections being vulcanized together as a homogeneous whole.

15. An expansible inflatable former composed only of vulcanized rubber and made up of a hollow annular body portion with molded inner and outer surfaces, and a solid, separately molded, annular base portion, the two portions being permanently united by vulcanization.

16. An expansible inflatable former composed only of vulcanized rubber and made up of a hollow annular body portion with molded inner and outer surfaces, and uniform wall thickness throughout, and a solid, separately molded, annular base portion, the two portions being permanently united by vulcanization.

17. An expansible inflatable former composed only of vulcanized rubber and made up of a hollow annular body portion with molded inner and outer surfaces, and a solid, separately molded, annular base portion, with an inflating valve molded in place, said body and base portions being permanently united by vulcanization.

In testimony whereof, we have affixed our signatures hereto.

WILLIAM S. WOLFE.
JESSE R. CROSSAN.